Feb. 5, 1952 L. J. KMIECIK 2,584,715
POP-TYPE SAFETY VALVE
Filed Sept. 7, 1945
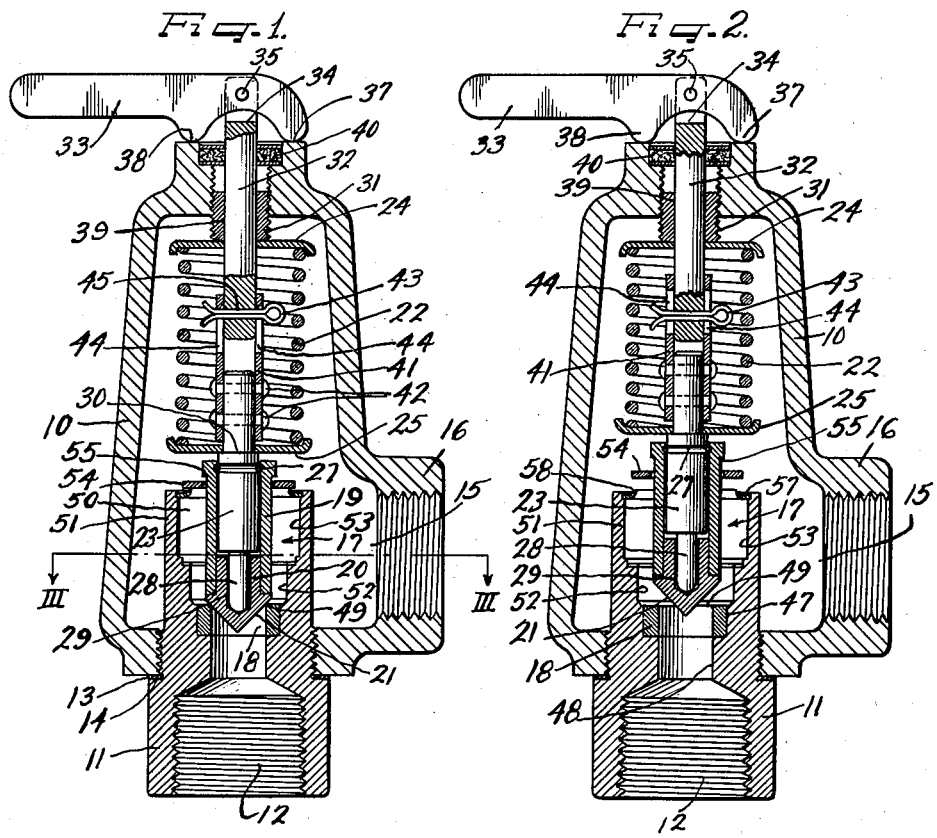
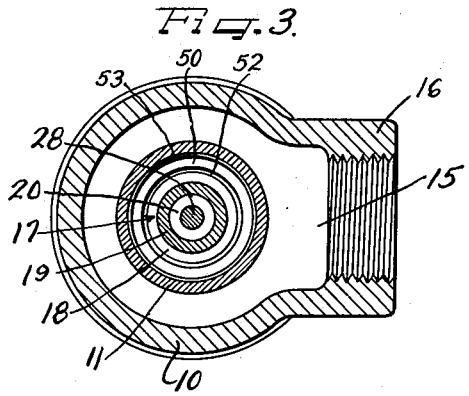
Inventor
Leo J. Kmiecik Patented Feb. 5, 1952

2,584,715

UNITED STATES PATENT OFFICE 2,584,715

POP-TYPE SAFETY VALVE

Leo J. Kmiecik, Chicago, Ill., assignor, by mesne assignments, to McDonnell & Miller, Inc., Chicago, Ill., a corporation of Delaware Application September 7, 1945, Serial No. 614,994

6 Claims. (Cl. 137—53)

This invention relates to improvements in safety valves of the pressure release or pop type.

Among the shortcomings in prior pop type pressure release safety valves, rather complicated and thus expensive construction is notable. Another shortcoming is that the seating contact between the valve members and their seats is excessive and the valve members and seats are so constructed that sticking and thus failure to open, or failure to reseat and consequent leaking, due to corrosion or sedimentation or entrance of foreign matter therebetween is all too frequent an occurrence. These deficiencies are especially noticeable and aggravating in connection with domestic hot water heaters. In this particular field competitive aspects require the lowest possible cost but nevertheless a sturdy, foolproof and efficient article. Another aspect in the domestic installation field is that due to notorious laxness in servicing, maintenance and attention to operating conditions, the liability of sticking, leaking or other failure due to corrosion, sedimentation or clogging is substantially increased.

It is, accordingly, an object of my invention to provide an improved pop safety valve which is of simple construction and which has such efficient, trouble-free operating characteristics as to afford exceptionally long and satisfactory periods of usefulness under such conditions as may be encountered in connection with domestic hot water heaters or systems, although of course it may be put to other and varied uses where a fluid under pressure such as hot water or steam is involved.

Another object is to provide a safety valve which is free to an unusual extent from liability of the moving parts sticking.

Still another object of the invention is to provide a safety or relief valve embodying improved construction insuring positive, reliable, foolproof and efficient operation.

In accordance with the general features of the invention there is provided a pop type of safety pressure release valve which comprises a valve member which is urged into improved line contact seating engagement with the valve seat by a spring which is loaded to maintain a predetermined resistance to opening of the valve in response to pressure exerted against the face or head of the valve exposed to the interior of the system, boiler, or heater with which the valve is used.

Another feature resides in providing a safety valve in which improved operational responsiveness is attained by a relatively large huddling chamber defined between the valve seat and a lateral flange structure at the end of the valve member remote from the seat and cooperative with a fixed huddling chamber wall surrounding the valve member in such a manner that a strong surge of fluid under excessive pressure released into the huddling chamber by even slight movement of the valve from its seat will drive with substantial acceleration against the lateral flange structure and thus positively pop the valve fully open.

Other objects, features and advantages of the invention will be readily apparent from the following description taken in conjunction with the accompanying two sheets of drawings, in which:

Figure 1 is a vertical sectional view through a preferred embodiment of the invention with certain parts shown in elevation;

Figure 2 is a similar vertical sectional view through the device shown in Figure 1 but with certain of the parts in slightly different relative positions showing a stage in the operation of the device; and Figure 3 is a horizontal sectional view taken substantially in the plane of line III—III of Figure 1.

In the embodiment of the invention shown, a safety pressure relief or release valve construction is provided which is especially useful in connection with a domestic hot water heater. To this end, the valve construction preferably comprises a relatively elongated housing or casing 10 of preferably somewhat tapered or frustoconical form into the enlarged end of which is threaded a tubular body 11 which in the present instance is internally threaded at its outer end portion for connection to a nipple or the like on on water heater or other part, conduit or vessel of a water heating system. The joint between the housing 10 and the body 11 is rendered watertight by a gasket 13 which is clamped to the adjacent end of the casing 10 by a shoulder 14 on the body. At its inner end, the body 11 extends to a substantial extent nozzle-fashion, longitudinally into the casing 10 opposite an outlet 15 opening through a boss 16 extending laterally from the base of the casing and preferably threaded for connection to a drainage duct. As will be noted the space within the casing 10 above and about the inwardly protruding or nozzle portion of the body 11 affords a relief chamber of substantial proportions.

According to the invention, a valve member 17 extends into the body member 11 and has sealing engagement with a valve seat member 18. The valve member 17 is of substantially smaller diameter than the body member 11 and is preferably elongated in form and may conveniently be constructed of a cylindrical tubular body 19 having a valve head 20 press fitted into its lower end as shown in Figures 1 and 2 and formed with a conical fluid pressure opposing and engagement or seating face 21.

Means for normally pressing the valve member 17 toward and into fluid sealing seating engagement against the valve seat member 18 comprises a coiled compression spring 22 which concentrically encircles a valve stem 23 and is retained under compression between respective upper and lower retaining washers 24 and 25 mounted coaxially upon the stem. The valve stem 23 extends down into the hollow valve body 19 and is retained therein against axial separation by a retaining ring 27 which interfits within complementary grooves provided therefor in the opposing walls of the valve body 19 and the stem. At its lower extremity, the valve stem 23 has a reduced diameter portion 28 which extends down into an axial bore 29 provided therefor in the inner or shank portion of the valve head 20. A seat for the lower spring-retaining washer 25 is provided by a shoulder 30 on the valve stem 23 just above where the valve stem emerges from the valve body 19. A fixed abutment for the upper spring-retaining washer 24 is provided by a member 31 which projects downwardly from the top of the casing 10.

By having the spring 22 of a calculated tension and pre-loaded to a predetermined extent by compression between the retaining washers 24 and 25, predetermined pressure is maintained against the valve 17 to hold it on its seat until the fluid pressure exerted against the valve face 21 exceeds a certain safe maximum value and thereby becomes great enough to unseat the valve in opposition to the spring loading. As soon as the system or vessel with which the valve is associated has been relieved and the pressure therein attains a safe level, the spring 22 of course snaps the valve 17 closed. In order to pre-adjust the spring loading, the abutment member 31 may be formed as a nut or set screw threaded into the roof of the housing 10 so that it can be adjusted to extend to a greater or less extent toward the spring retaining washer 24.

Manual unseating of the valve 17 for test or inspection purposes or to blow the pressure vessel with which the valve is associated, is provided for by an extension 32 on the valve stem 23 projecting from the top of the casing 10 and carrying a manipulating member in the form of a release lever 33. The lever 33 is of substantial length, and is received rockably adjacent to but short of one of its ends within a slot 34 in the extension 32 and is secured by means of a pivot pin 35. The short extremity of the lever 33 is formed with a downwardly projecting rounded cam finger 37 engageable with the top of the casing 10 in spaced relation to one side of the stem extension 32 to serve as a fulcrum. A similar cam finger 38 is formed to project downwardly from the lever and provide a fulcrum in spaced relation to the opposite side of the stem extension 32. Therefore, either a lift or a downward push upon the laterally projecting handle portion of the lever 33 will cause the stem extension 32 to be lifted for opening the valve 17.

A vertical guide for the stem extension 32 is, in this instance, provided by the abutment member 31 which, for this purpose, is provided with a central bore 39 so as to provide a bushing about the stem extension. Above the bushing member 31 a fluid-tight seal is provided by a packing gland 40 which is set into the top of the casing 10 about the stem extension.

If the stem extension 32 should for any reason become axially immovable as by being stuck due to corrosion or other internal causes or be immobilized by something resting on its top or the adjacent portion of the lever 33, the valve 17 will nevertheless operate for safety release purposes by reason of the provision of a slip connection between the valve stem proper 23 and the extension 32. Accordingly, the adjacent ends of the stem and its extension are spaced substantially apart and are connected together through the medium of a sleeve 41. In the present instance, the sleeve 41 is secured fixedly about the inner or upper end of the stem proper 23 as by means of rivets 42 and extends into relatively slidable relation about the adjacent or lower end portion of the extension 32. Means for connecting the sleeve 41 and the extension 32 so as to permit lifting of the valve stem 23 through the extension 32 comprises a connecting element such as a cotter pin 43 extending through diametrically formed longitudinal lost motion slots 44 in the connecting sleeve and a transverse closely fitting pin bore 45 in the stem extension. The slots 44 are so disposed and of such length that in the normal closed condition of the valve 17 the cotter pin 43 just engages the upper ends of the slots (Figure 1). This leaves the lower ends of the slots fully available for clearing the cotter pin 43 to permit the sleeve 41 to slide longitudinally upwardly on the stem extension 32 upon opening movement of the valve 17, substantially as indicated in Figure 2. As a result, the present valve construction affords double assurance of safety, in that not only may it be tested periodically by opening or popping it through the medium of the handle lever 33, but also should pressure conditions arise which should cause the valve to pop, no interference with successful functioning of the valve will arise due to any sticking or other immobilization of the valve stem extension 32 against upward or outward axial movement.

Positive assurance of maximum efficiency and unlimited trouble-free operation of the valve 17 is attained by a novel relationship of the valve 17, the valve seat 18, and the surrounding portion of the body 11 which projects upwardly within the casing 10. To this end, the valve seat member 18 is preferably formed as a hardened, non-corroding annular insert set within an annular rabbet groove 47 concentric with a reduced diameter pressure port 48 and formed with a relatively sharp inner valve seat edge 49 against which the conical valve face 21 engages with a line contact. In this way, all danger of sticking of the valve face 21 against the valve seat edge 49 is avoided. Due to the hardness of the valve seat insert 18 it will hold the relatively fine line seat 49 wear free indefinitely. Furthermore, due to the conical form of the valve face 21 extending down into the pressure port 48, maximum area is presented to the pressure fluid which will rise up or be present within the port 48 in the event of excess pressure which should cause the valve to open for relief. This feature results in a more sensitive, surer, and safer valve. The internal diameter of the valve seat ring 18 may be equal to that of the relief port 48.

In addition, means is provided for assuring instantaneous popping of the valve 17 in the event that conditions demanding relief arise. This is accomplished by having the valve seat member 18 located deep down within the body 11 and by the provision of a relatively long and large huddling chamber 50 between the escape side of the valve seat and the upper edge of the body 11 which extends to nearly the inner or upper end of the long valve body 19 and thereby, in effect, provides a nozzle extension 51 thereabout. By having the huddling chamber 50 formed of progressively increasing internal area, as shown, with a relatively restricted lower section 52 and a substantially larger diameter upper section 53, which is also of greater length, a maximum rapid surging of pressure fluid released past the unseated valve up through the huddling chamber reacts full force to instantaneously pop the valve fully open by reacting against a closure flange member 54 extending radially about the upper end portion of the valve member 17. The pop flange 54 in effect increases the effective area of the valve subject to fluid pressure. It will be noted, however, that the huddling chamber 50 is several times as long as its width or the width of the pop flange 54.

The construction and relationship of the pop flange 54 to the valve member 17 and to the huddling chamber 50 is such as to assure permanently trouble-free operation. Accordingly, the pop flange 54 is preferably formed as a flat ring loosely centered about but nevertheless fairly closely related to the valve body 19 and engageable with an overhanging lift shoulder 55 on the valve body when urged thereagainst by the force of pressure fluid from the huddling chamber 50. A seat is provided for the pop flange 54 at the top of the huddling chamber 50 by means such as a corrosion proof seating ring 57 set into partially closing relation to the huddling chamber 50 at the top of the nozzle extension 51 and formed with an annular inner edge upwardly projecting line contact seating lip 58. By preference, the lip 58 extends upwardly on a curved contour to provide in effect a funnel from the huddling chamber 50 directed against the lower face of the pop flange 54.

In the normal or at rest condition of the valve, the pop flange retaining shoulder 55 preferably lies spaced above the pop flange 54 so as to afford a slight lost motion clearance for the latter between the shoulder and the seat 58 to accelerate the initial popping action of the flange 54 and cause it to snap off of the line contact seat 58 during pressure relief operation. Another advantage of having the pop flange 54 loosely related to the valve body 19 is that in the event the interior of the casing 10 should for any reason be filled with liquid, the reaction of such liquid backing against the upper face of the pop flange, will have no deterrent effect upon free opening of the valve 17 in response to excessive pressure built up against the valve face 21, since the valve body 19 can move freely longitudinally through the pop flange. By the same token, should there be a counter or back surge of fluid within the chamber of the housing 10 during a relief action, such back surge will act upon the pop flange 54 and drive it back against its seat 58 and thus instantaneously block the force of back surge from carrying over into the vessel or conduit with which the valve is associated for safety relief purposes. To this extent the pop flange 54 operates as a flutter valve. It may be noted, however, that resurgence is not very likely to occur with the present valve construction because due to the nozzle arrangement 51 which issues into the substantial chamber defined thereabove by the casing 10, and by having the outlet 15 located with its port below the mouth of the nozzle, the impact or surging force of fluid issuing from the nozzle is fairly dissipated before the fluid leaves the outlet and in the absence of obstruction building up of sudden counter pressure in the drainage or exhaust duct is avoided.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A safety valve comprising, in combination, a valve housing having inlet and outlet openings disposed with the inlet entering the lower end of the housing and the outlet through the side of the housing adjacent to the inlet and with the housing providing a substantial chamber above both of said openings, a tubular inlet body extending upwardly into the housing from said inlet opening to a height substantially above the axis of the outlet opening and being of smaller external diameter than the surrounding portion of the housing, a valve seat in the lower portion of said body, a valve member engaging said valve seat and arranged to be acted upon from underneath by fluid pressure transmitted through said inlet body, said valve member including an elongated cylindrical portion extending upwardly through said body and beyond the upper end of the body and of substantially smaller diameter than the internal diameter of the body above said valve seat, a ring-shaped member mounted upon the upper end portion of the body and extending radially inwardly toward the cylindrical upper portion of the valve member to partially close the space within the body member between the ring-shaped member and said valve seat to provide a huddling chamber in said space, the internal periphery of said ring-shaped member affording fluid passage upwardly past the valve member from the huddling chamber, a ring-shaped flange member loosely encircling the upper portion of the valve member and normally seated on said first mentioned ring-shaped member to provide a pop valve flange closing the upper end of the huddling chamber, the upper extremity of the valve member having a radially extending flange overlying said pop valve flange to limit upward unseating movement of the pop valve flange but the portion of the valve member below said limiting flange being entirely free from engagement with the pop valve flange to the limit of opening movement of the valve member so that said pop valve flange can seat itself independently of the valve member for blocking back surge into the huddling chamber.

2. A safety valve comprising, in combination, a valve housing having inlet and outlet openings disposed with the inlet entering the lower end of the housing and the outlet through the side of the housing adjacent to the inlet and with the housing providing a substantial chamber above both of said openings, a tubular inlet body extending upwardly into the housing from said inlet opening to a height substantially above the axis of the outlet opening and being of smaller external diameter than the surrounding portion of the housing, a valve seat in the lower portion of said body, a valve member engaging said valve seat and arranged to be acted upon from underneath by fluid pressure transmitted through said inlet body, said valve member including an elongated cylindrical portion extending upwardly through said body and beyond the upper end of the body and of substantially smaller diameter than the internal diameter of the body above said valve seat, a ring-shaped member mounted upon the upper end portion of the body and extending radially inwardly toward the cylindrical upper portion of the valve member to partially close the space within the body member between the ring-shaped member and said valve seat to provide a huddling chamber in said space, the internal periphery of said ring-shaped member affording fluid passage upwardly past the valve member from the huddling chamber, a ring-shaped flange member loosely encircling the upper portion of the valve member and normally seated on said first mentioned ring-shaped member to provide a pop valve flange closing the upper end of the huddling chamber, the upper extremity of the valve member having a radially extending flange overlying said pop valve flange to limit upward unseating movement of the pop valve flange but the portion of the valve member below said limiting flange being entirely free from engagement with the pop valve flange to the limit of opening movement of the valve member so that said pop valve flange can seat itself independently of the valve member for blocking back surge into the huddling chamber, said first mentioned ring-shaped member having an upwardly projecting fine line annular portion defining a valve seat for said pop valve flange.

3. In combination in a safety valve of the character described, a casing defining a chamber of substantial size and having an inlet opening in the bottom thereof and an outlet opening from the side thereof, means in said inlet opening defining a valve seat, a valve member engaging with said seat and responsive to pressure from beneath the same to leave the valve seat, said valve member having a stem extending upwardly therefrom into the chamber but terminating substantially below the top of the chamber, a stem member extending through the top of the casing coaxial with the valve stem and having the lower end thereof adjacent to the upper end of the valve stem, a member fixedly secured to the valve stem and slidably engaging said stem member, said fixedly secured member having a vertical slot in its upper portion where it slidably engages said stem member, a cotter pin extending through the slot and said stem member and effecting a lost motion connection through said fixedly secured member between said valve stem and said stem member, a coiled compression spring encircling said stems and said fixedly secured member and said cotter pin in spaced relation and normally acting between abutment and centering means at the top of the chamber and abutment and centering means on said valve stem below said fixedly secured member for urging the valve into seating relation on said valve seat, and a release lever on the upper end of said stem member for actuating the stem member to act through said lost motion connection and said valve stem to lift the valve from its seat in opposition to said spring for mechanically unseating the valve.

4. In combination in a safety valve construction, a casing having an inlet and an outlet, a tubular body secured in said inlet and having a nozzle-like portion extending into the casing to a substantial extent, said body having internally a reduced diameter valve seat with the interior of the body nozzle-like portion inwardly from the valve seat of substantially enlarged diameter, a tubular body of a diameter intermediate the diameter of said valve seat and the diameter of the enlarged internal diameter of the nozzle-like portion extending concentrically within the nozzle-like portion and projecting thereabove, a conical valve head secured in the lower end of said tubular member, said valve head having a shank portion within said tubular member and said shank portion having an axial bore opening into the bore of said tubular member, a valve stem extending into said tubular member and having a reduced diameter portion in said axial bore, means attaching the valve stem to said tubular member, and means including a ring-shaped closure flange member encircling the portion of said tubular member beyond the tip of said nozzle-like portion and cooperating with the nozzle-like portion to provide a pop valve flange, said tubular member and said flange member being relatively axially movable.

5. In combination in a valve construction of the character described, means providing an elongated fluid passage, means defining a main valve seat at an intermediate point in said passage, a valve member of elongated form within said passage and engaging said seat, means urging said valve member to its seat and being responsive to fluid pressure on said valve member in excess of a predetermined maximum to allow said valve member to leave its seat, means spaced beyond the escape side of said valve seat and providing an auxiliary valve seat, and a pop flange extending loosely laterally about said valve member and engageable with said auxiliary valve seat, said valve member having a flange-engaging shoulder normally spaced from said pop flange in the direction of opening movement of the pop flange and providing for initial lost motion accelerating movement of the pop flange, said pop flange and said valve member being freely relatively axially movable with respect to that portion of the valve member between said shoulder and the seat-engaging position of the valve member so that the pop flange can engage said auxiliary valve seat to block back surge even when the valve member is fully open.

6. In combination in a safety valve of the character described, means defining a chamber having an outlet, means providing an imperforate fluid passage in said chamber having a valve seat therein and a mouth within said chamber spaced from said valve seat, a valve member engageable with said seat and normally biased to retain said seat engagement until opposed in opening direction by fluid pressure in excess of a predetermined maximum, said valve member being of smaller external diameter than the internal diameter of said passage and being of a length to extend normally beyond said mouth, a valve seat at said mouth comprising a fine line edge extending away from said valve seat within the passage, and a ring-shaped pop valve flange relatively reciprocably encircling said valve member and normally engaging said fine line valve seat edge, said valve member having a shoulder opposing said pop flange valve in normally spaced relation within said chamber to permit opening movement of the pop flange valve relative to said valve member, said valve member being of uniform diameter from said shoulder throughout its range of opening movement beyond said mouth so that the pop flange valve can move relative to said valve member onto said seat edge responsive to back surge in said chamber.

LEO J. KMIECIK.

REFERENCES CITED

The following references are of record in the file of this patent:

UNITED STATES PATENTS

| Number | Name | Date |
|---|---|---|
| 272,634 | Blessing | Feb. 20, 1883 |
| 281,369 | Jarecki | July 17, 1883 |
| 404,684 | Colven | June 4, 1889 |
| 408,418 | Larkin | Aug. 6, 1889 |
| 446,757 | Kunkle | Feb. 17, 1891 |
| 461,149 | Fogel | Oct. 13, 1891 |
| 1,164,990 | Cockburn et al. | Dec. 21, 1915 |
| 1,332,886 | Cockburn | Mar. 9, 1920 |
| 1,355,149 | Kelley | Oct. 12, 1920 |
| 1,598,487 | Marden | Aug. 31, 1926 |
| 1,668,075 | Hellwig | May 1, 1928 |
| 2,264,656 | Briscoe et al. | Dec. 2, 1941 |
| 2,364,812 | Pierson | Dec. 12, 1944 |

FOREIGN PATENTS

| Number | Country | Date |
|---|---|---|
| 4,175 | Great Britain | Dec. 19, 1873 |
| 99,908 | Sweden | Sept. 24, 1940 |
| 254,224 | Great Britain | July 1, 1926 |